(12) United States Patent
Fukushi et al.

(10) Patent No.: US 12,504,438 B2
(45) Date of Patent: Dec. 23, 2025

(54) AUTOMATIC ANALYZER

(71) Applicant: Hitachi High-Tech Corporation, Tokyo (JP)

(72) Inventors: Yudai Fukushi, Tokyo (JP); Yasuhiro Keta, Tokyo (JP); Eiichiro Takada, Tokyo (JP); Fuka Matsudaira, Tokyo (JP); Ai Masuda, Tokyo (JP); Takanori Nishiyama, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 653 days.

(21) Appl. No.: 17/798,234

(22) PCT Filed: Dec. 1, 2020

(86) PCT No.: PCT/JP2020/044679
§ 371 (c)(1),
(2) Date: Aug. 8, 2022

(87) PCT Pub. No.: WO2021/171722
PCT Pub. Date: Sep. 2, 2021

(65) Prior Publication Data
US 2023/0121166 A1 Apr. 20, 2023

(30) Foreign Application Priority Data
Feb. 28, 2020 (JP) ................. 2020-032677

(51) Int. Cl.
*B01L 3/00* (2006.01)
*B01F 33/302* (2022.01)
(Continued)

(52) U.S. Cl.
CPC ....... *G01N 35/025* (2013.01); *G01N 35/1002* (2013.01); *G01N 2035/00801* (2013.01);
(Continued)

(58) Field of Classification Search
CPC ............ G01N 35/025; G01N 35/1002; G01N 2035/00801; G01N 2035/0405;
(Continued)

(56) References Cited

U.S. PATENT DOCUMENTS 3,361,343 A * 1/1968 Lerner ................. B04B 5/0421
494/20
5,628,962 A 5/1997 Kanbara et al.
(Continued)

FOREIGN PATENT DOCUMENTS

EP 3 739 340 B1 1/2023
JP 11-511846 A 10/1999
(Continued)

OTHER PUBLICATIONS

International Search Report (PCT/ISA/210) issued in PCT Application No. PCT/JP2020/044679 dated Mar. 2, 2021 with English translation (five (5) pages).
(Continued)

*Primary Examiner* — Jennifer Wecker
*Assistant Examiner* — Oyeleye Alexander Alabi
(74) *Attorney, Agent, or Firm* — Crowell & Moring LLP

(57) ABSTRACT

Provided is an automatic analyzer in which a lid of a reagent vessel does not hinder the dispensing of the reagent.
An automatic analyzer for analyzing a specimen includes a reagent dispensing unit for dispensing a reagent from a reagent bottle in which a plurality of reagent vessels storing reagents used for the analysis of the specimen are arranged in one direction, and a reagent rack in which reagent bottles are stored, in which the reagent rack includes a lid opening unit for opening a lid corresponding to an upward opening of the reagent vessel along an arrangement direction of the
(Continued)

reagent vessels, and a lid fixing unit for fixing the lid to the outside of a path in which the reagent dispensing unit is inserted into the opening.

8 Claims, 15 Drawing Sheets

(51) Int. Cl.
| | |
|---|---|
| *B01F 33/3033* | (2022.01) |
| *B01L 7/00* | (2006.01) |
| *B01L 9/00* | (2006.01) |
| *B23D 63/00* | (2006.01) |
| *B29C 37/00* | (2006.01) |
| *B65G 47/80* | (2006.01) |
| *B82Y 20/00* | (2011.01) |
| *B82Y 30/00* | (2011.01) |
| *B82Y 40/00* | (2011.01) |
| *C07K 1/30* | (2006.01) |
| *C12M 1/26* | (2006.01) |
| *C12M 1/34* | (2006.01) |
| *C12M 3/06* | (2006.01) |
| *C12N 1/14* | (2006.01) |
| *C12N 1/20* | (2006.01) |
| *C12Q 1/02* | (2006.01) |
| *C12Q 1/6806* | (2018.01) |
| *C12Q 1/6844* | (2018.01) |
| *C12Q 1/6848* | (2018.01) |
| *C12Q 1/686* | (2018.01) |
| *C23C 2/00* | (2006.01) |
| *G01N 15/10* | (2024.01) |
| *G01N 15/14* | (2024.01) |
| *G01N 15/1433* | (2024.01) |
| *G01N 21/29* | (2006.01) |
| *G01N 21/41* | (2006.01) |
| *G01N 21/45* | (2006.01) |
| *G01N 21/65* | (2006.01) |
| *G01N 33/543* | (2006.01) |
| *G01N 33/574* | (2006.01) |
| *G01N 33/58* | (2006.01) |
| *G01N 33/68* | (2006.01) |
| *G01N 35/00* | (2006.01) |
| *G01N 35/02* | (2006.01) |
| *G01N 35/04* | (2006.01) |
| *G01N 35/10* | (2006.01) |
| *G02B 6/42* | (2006.01) |

(52) U.S. Cl.
CPC ........... *G01N 2035/0405* (2013.01); *G01N 2035/0406* (2013.01); *G01N 2035/0443* (2013.01)

(58) Field of Classification Search
CPC ... G01N 2035/0406; G01N 2035/0443; G01N 35/04; G01N 2035/0451; B01L 3/50825; B01L 3/523; B01L 9/06
See application file for complete search history.

(56) References Cited

U.S. PATENT DOCUMENTS

| | | |
|---|---|---|
| 7,569,189 B2 | 8/2009 | Jacobs et al. |
| 10,471,433 B1 | 11/2019 | Bell |
| 2012/0328475 A1 | 12/2012 | Sakairi et al. |
| 2013/0064735 A1 | 3/2013 | Arras et al. |
| 2014/0271403 A1 | 9/2014 | Wilmes |
| 2018/0188275 A1 | 7/2018 | Noda et al. |
| 2020/0033374 A1 | 1/2020 | Kabe et al. |
| 2020/0363440 A1 * | 11/2020 | Sattler .................. G01N 35/04 |

FOREIGN PATENT DOCUMENTS

| | | |
|---|---|---|
| JP | 2013-524190 A | 6/2013 |
| JP | 2017-75789 A | 4/2017 |
| WO | WO 96/09554 A1 | 3/1996 |
| WO | 2011/001645 A1 | 1/2011 |
| WO | WO 2011/074472 A1 | 6/2011 |
| WO | WO 2011/121030 A1 | 10/2011 |
| WO | WO 2017/018163 A1 | 2/2017 |
| WO | WO-2018173464 A1 * | 9/2018 ............. B01L 3/523 |

OTHER PUBLICATIONS

Japanese-language Written Opinion (PCT/ISA/237) issued in PCT Application No. PCT/JP2020/044679 dated Mar. 2, 2021 (four (4) pages).
Extended European Search Report issued in European Application No. 20922070.6 dated Feb. 9, 2024 (8 pages).
Hindi-language Office Action issued in Indian Application No. 202217048004 dated Sep. 30, 2025, with English translation (6 pages).

* cited by examiner

[FIG. 1]
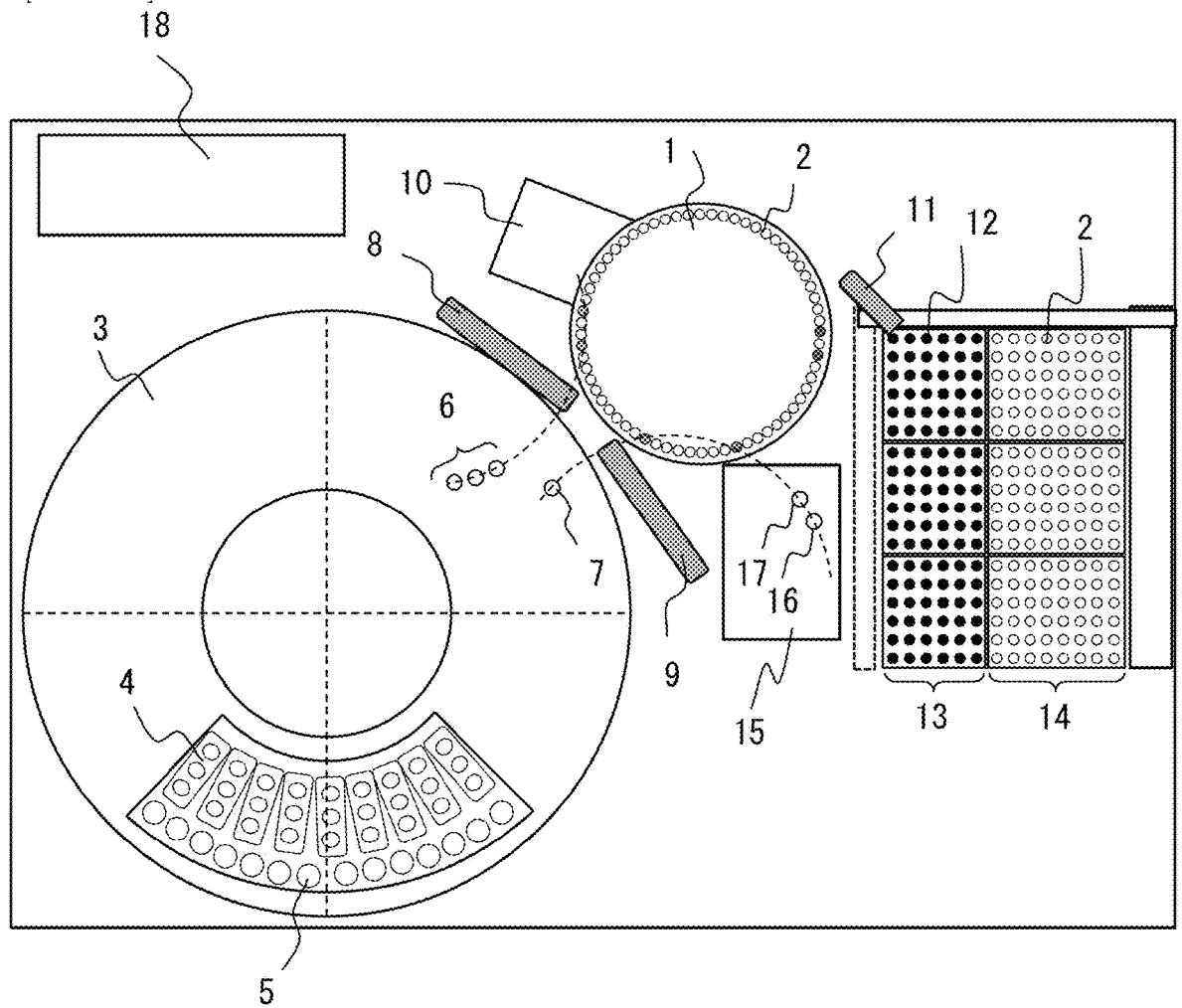

[FIG. 2]
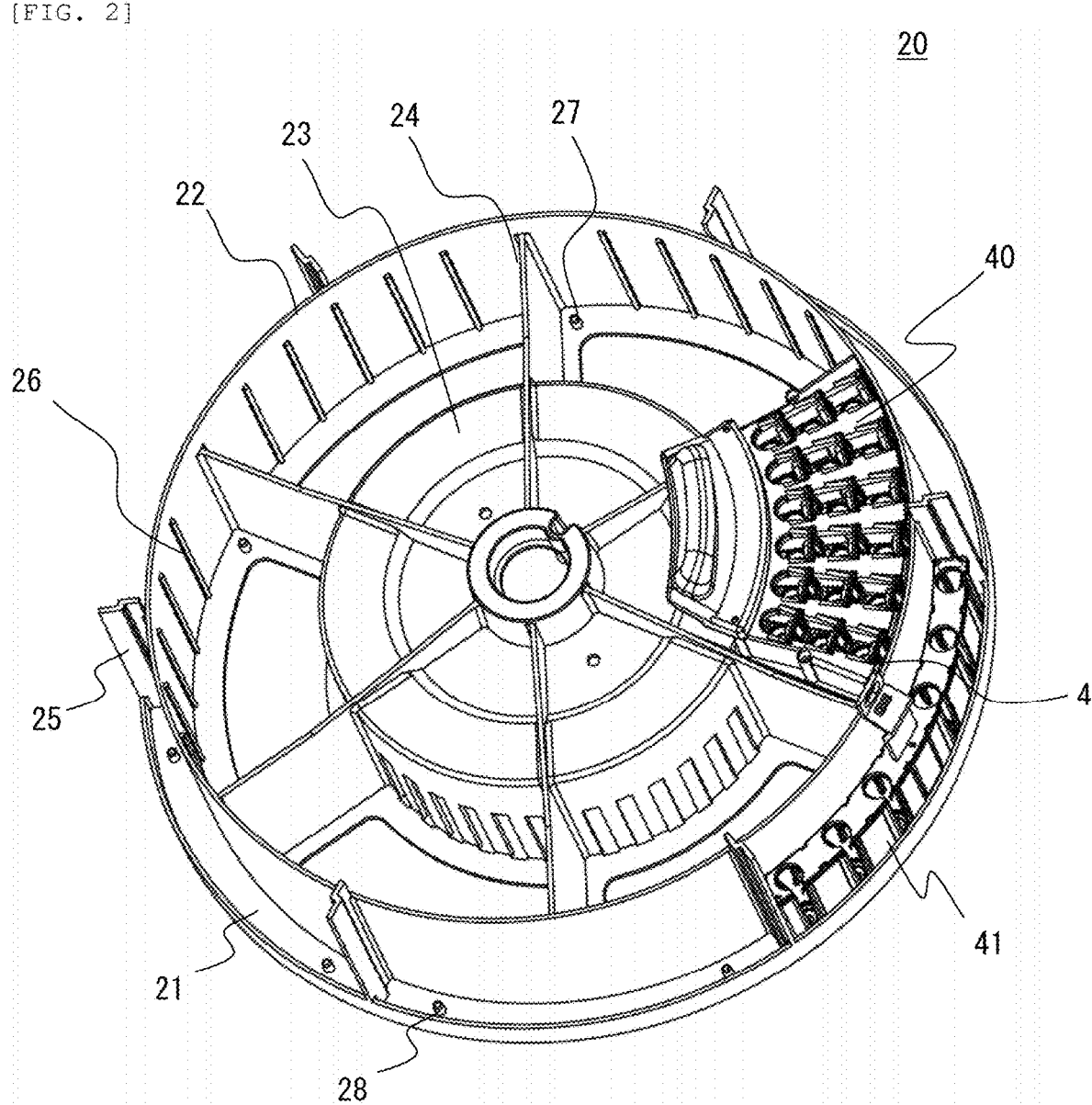

[FIG. 3A]
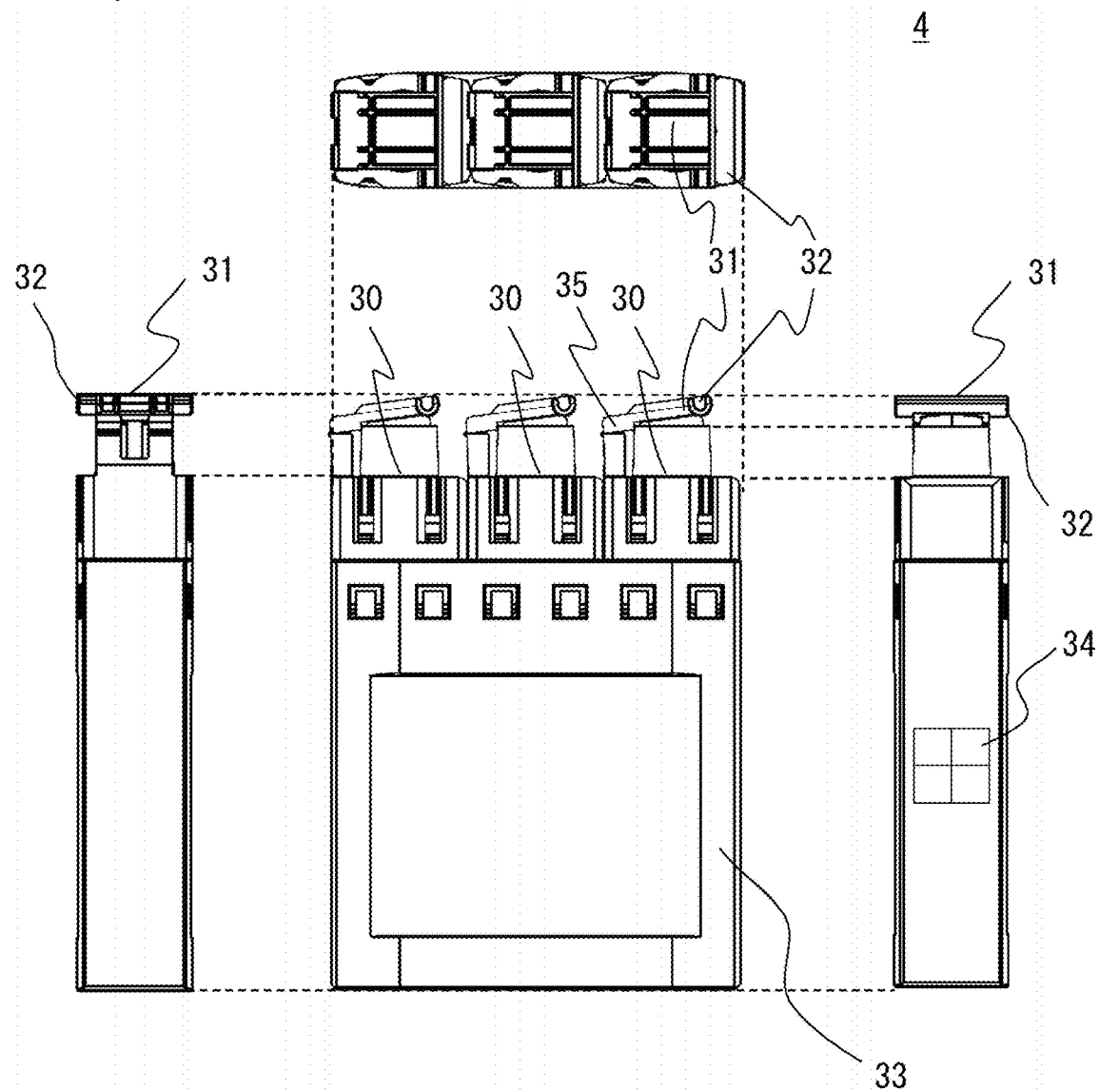

[FIG. 3B]
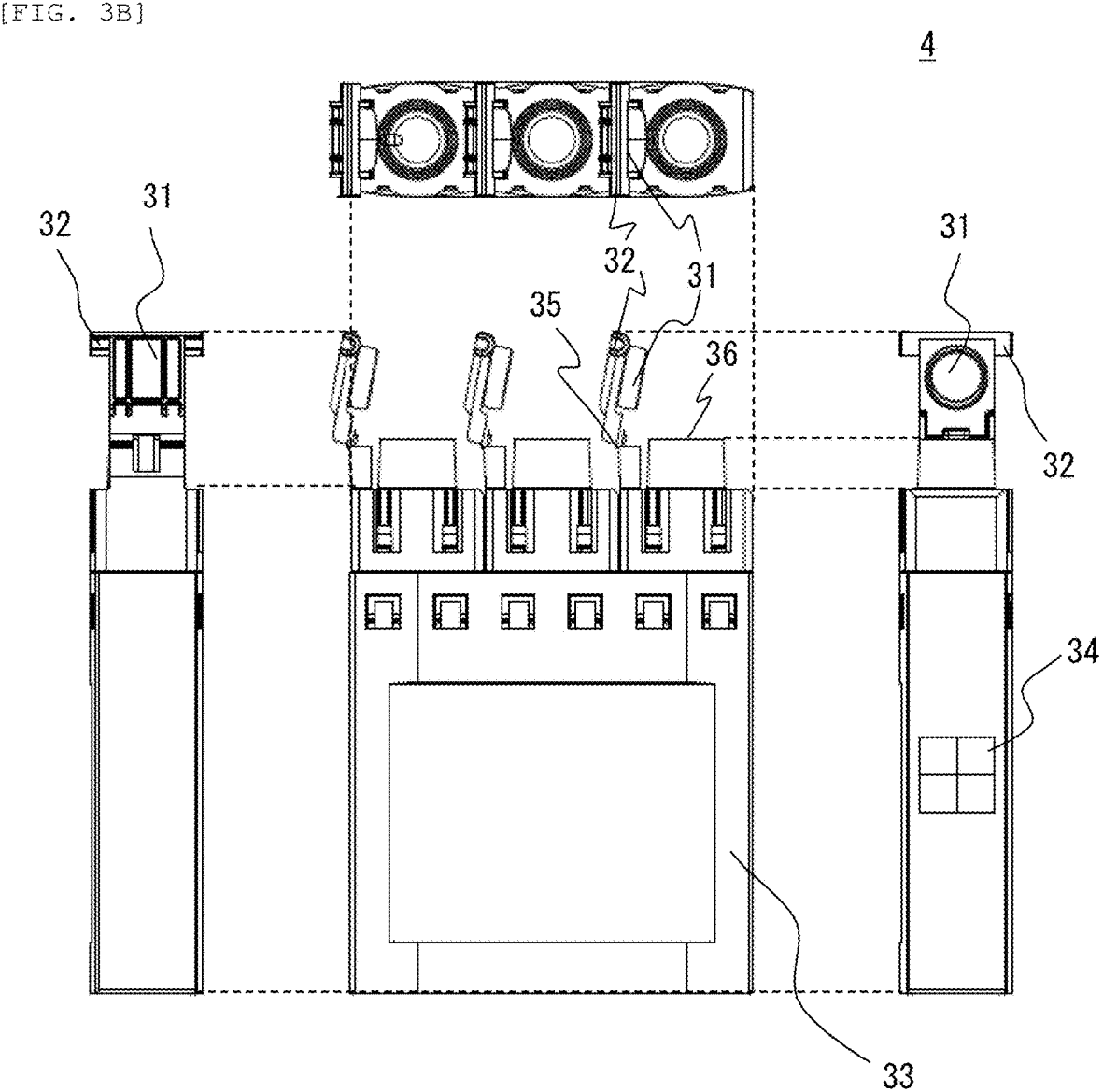

[FIG. 4A]
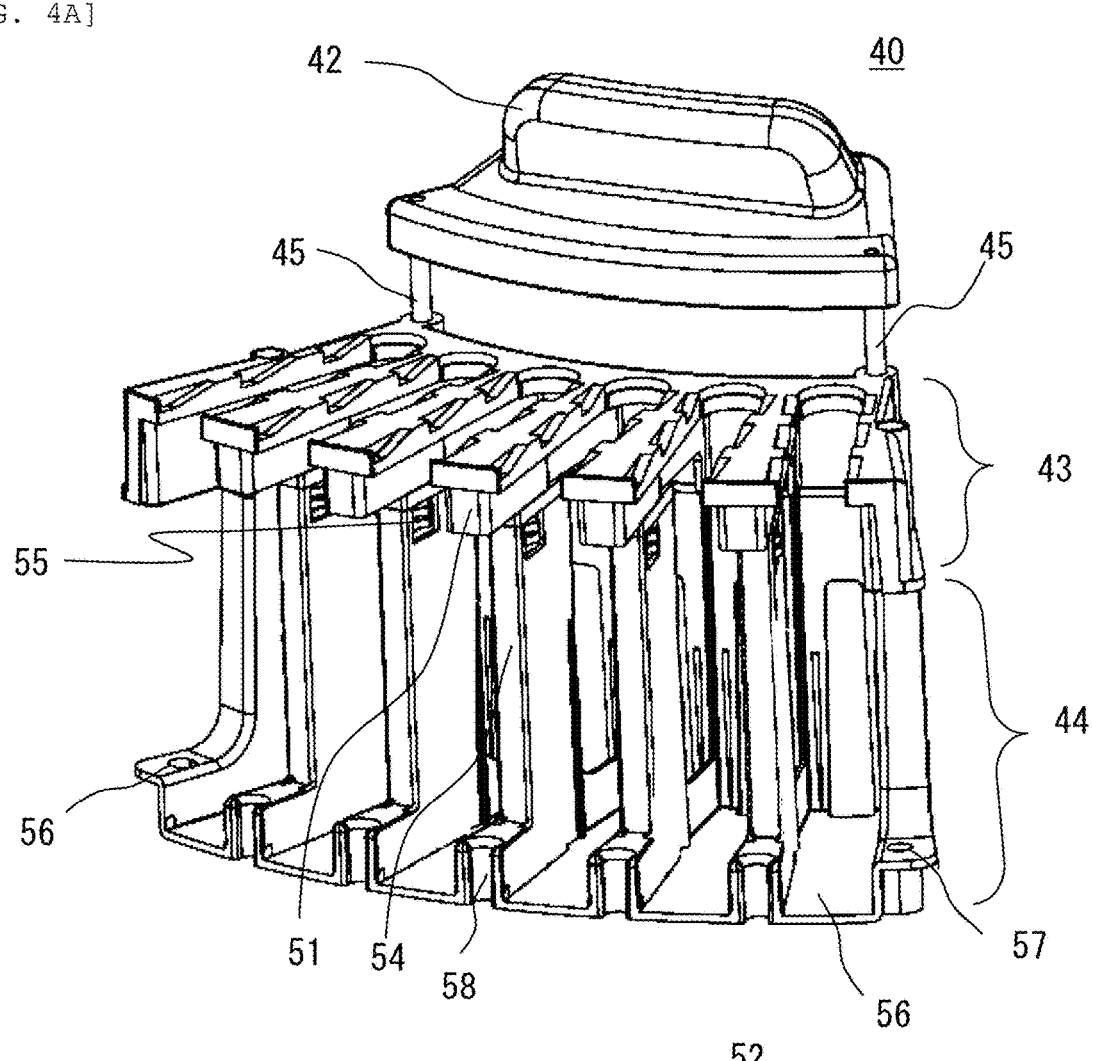
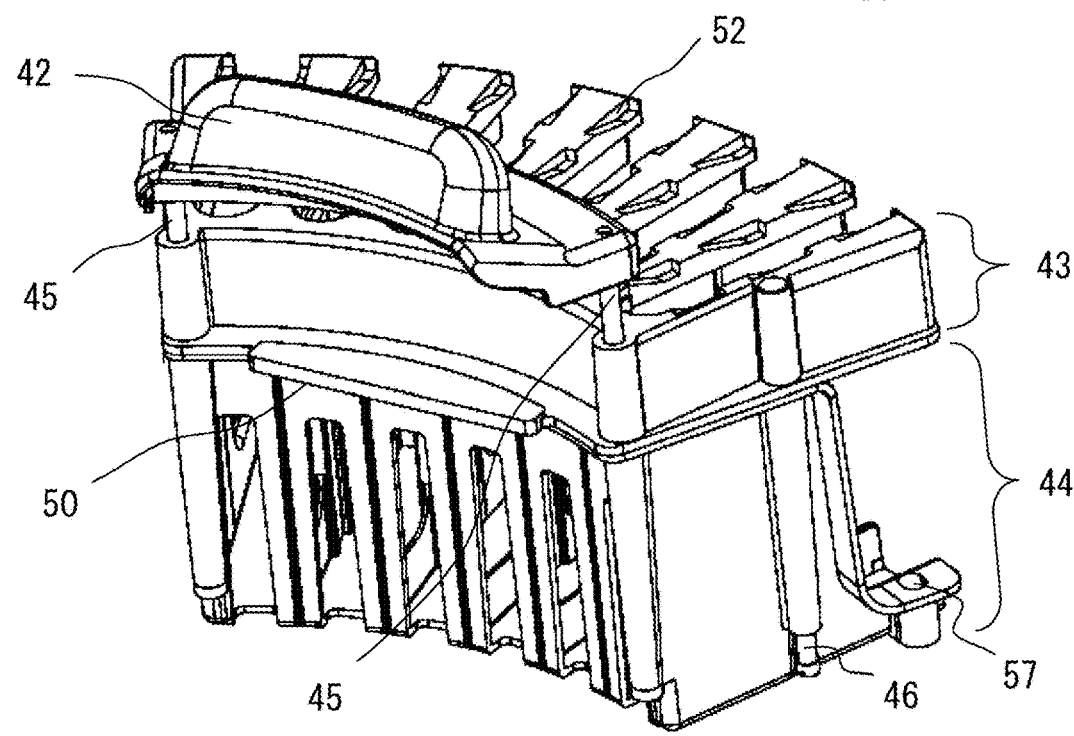

[FIG. 4B]
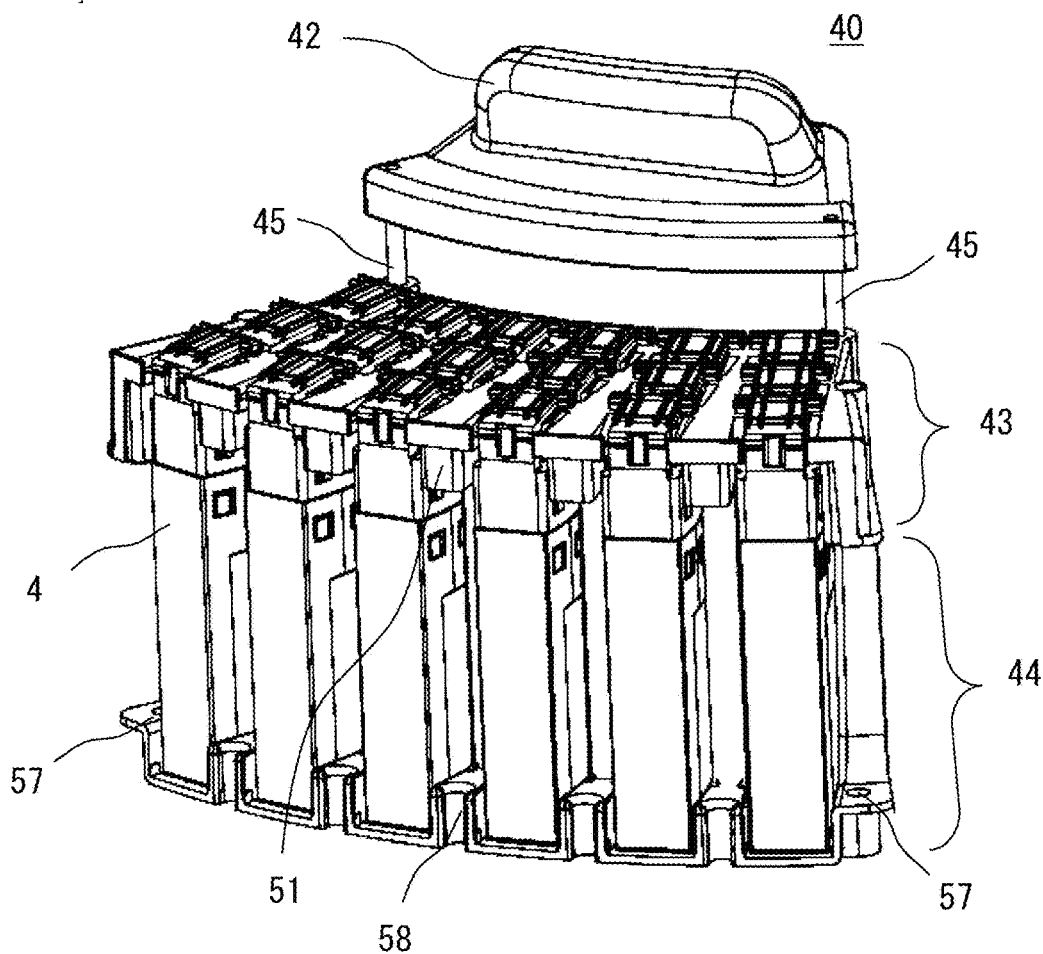
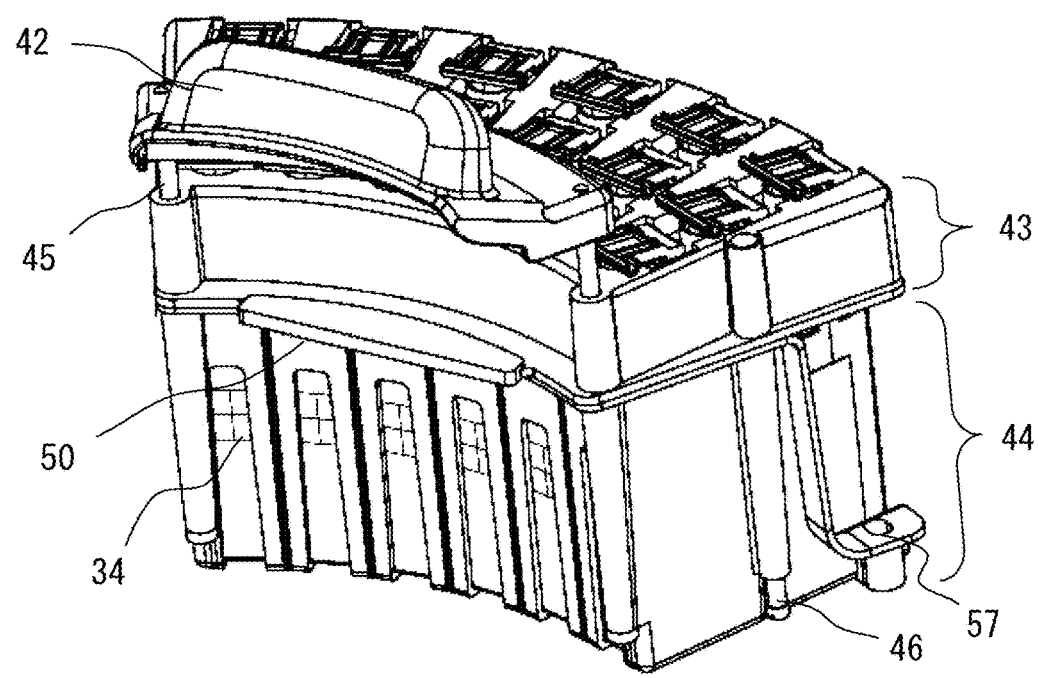

[FIG. 4C]
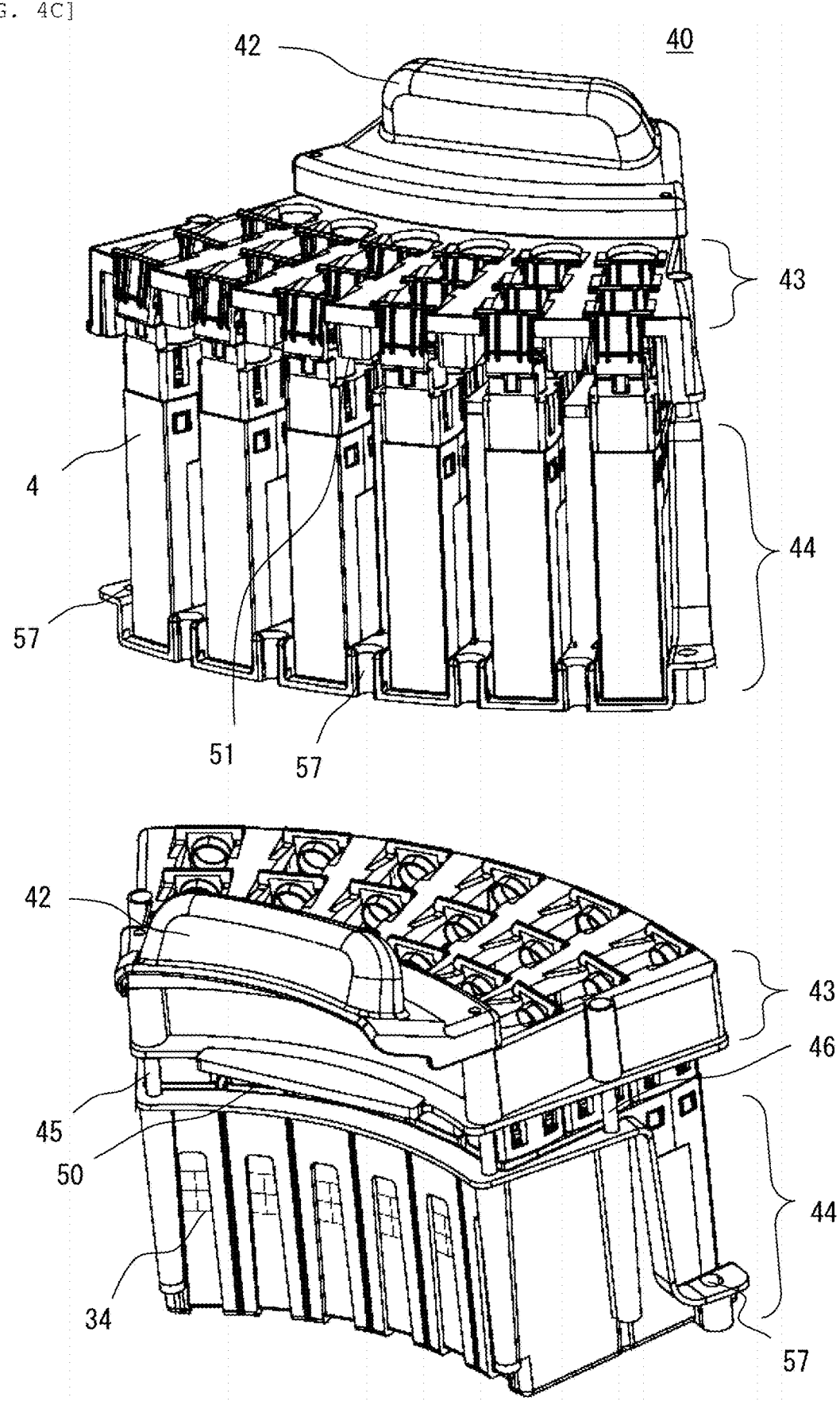

[FIG. 5A]
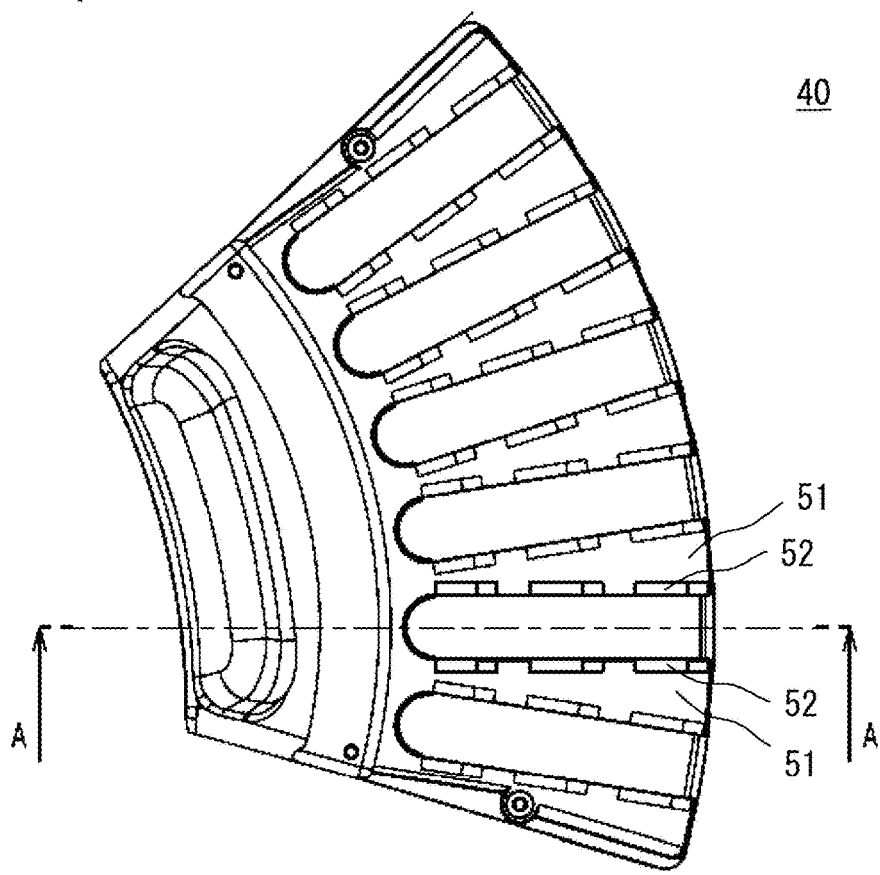
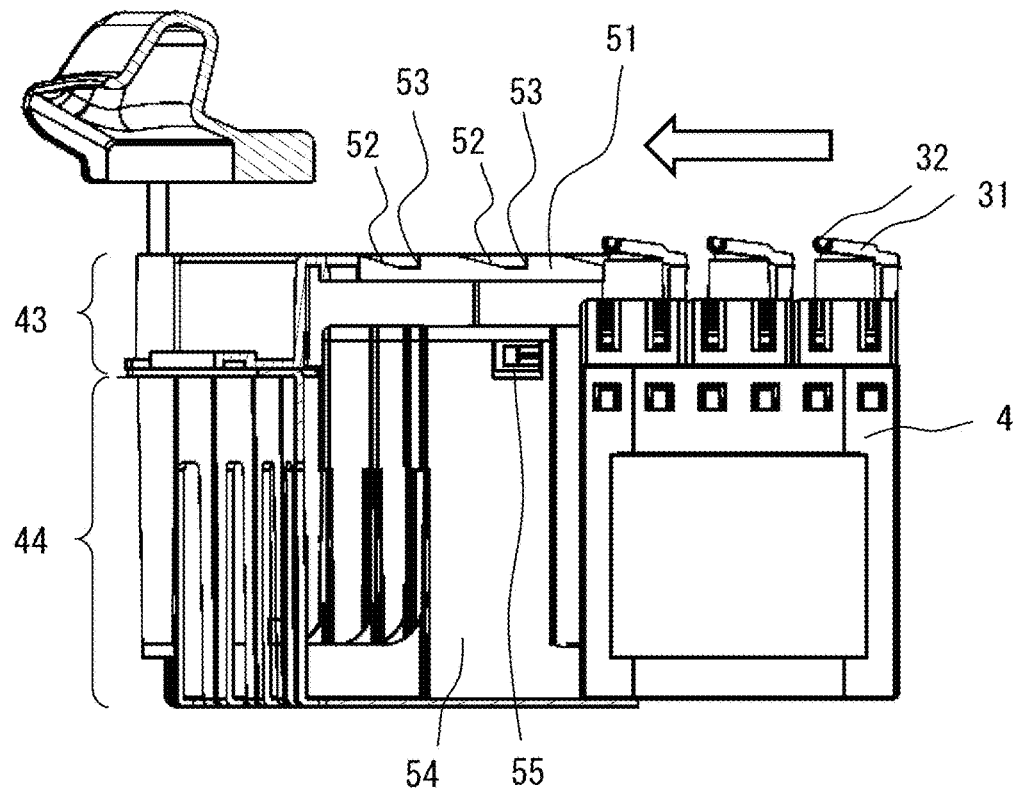

[FIG. 5B]
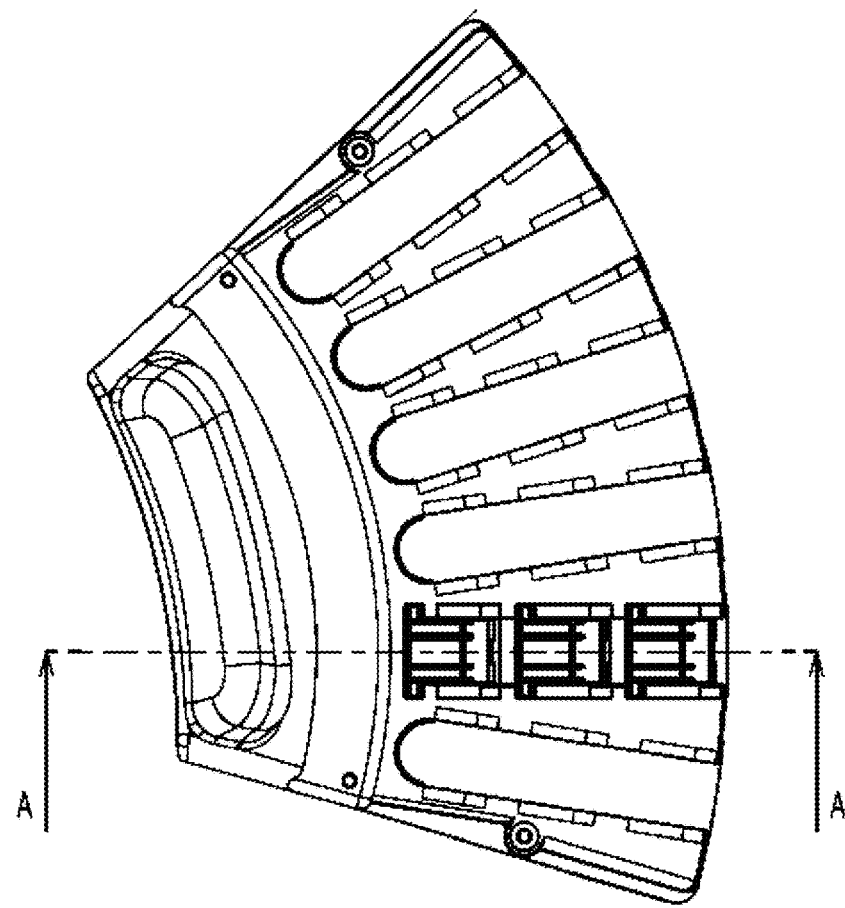
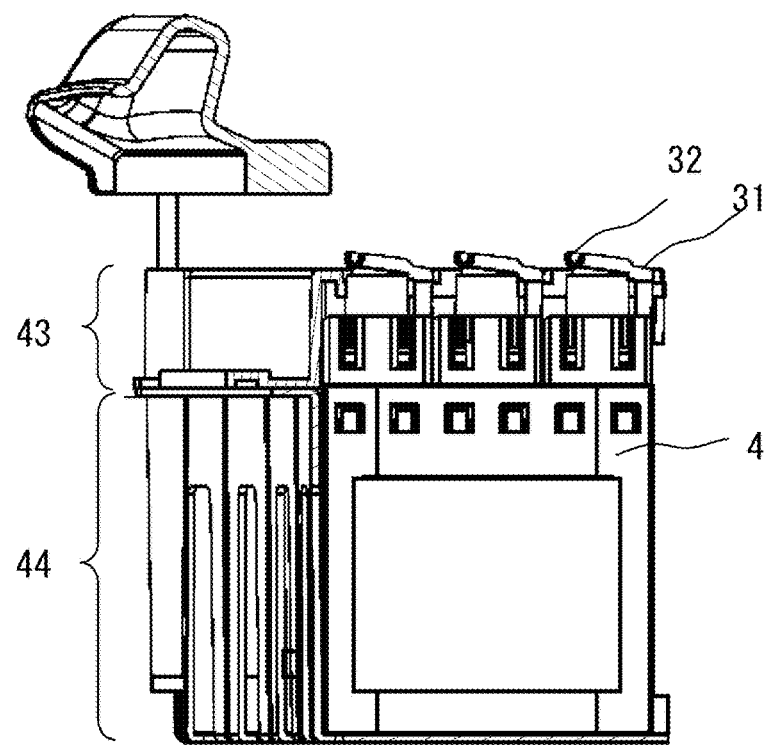

[FIG. 5C]
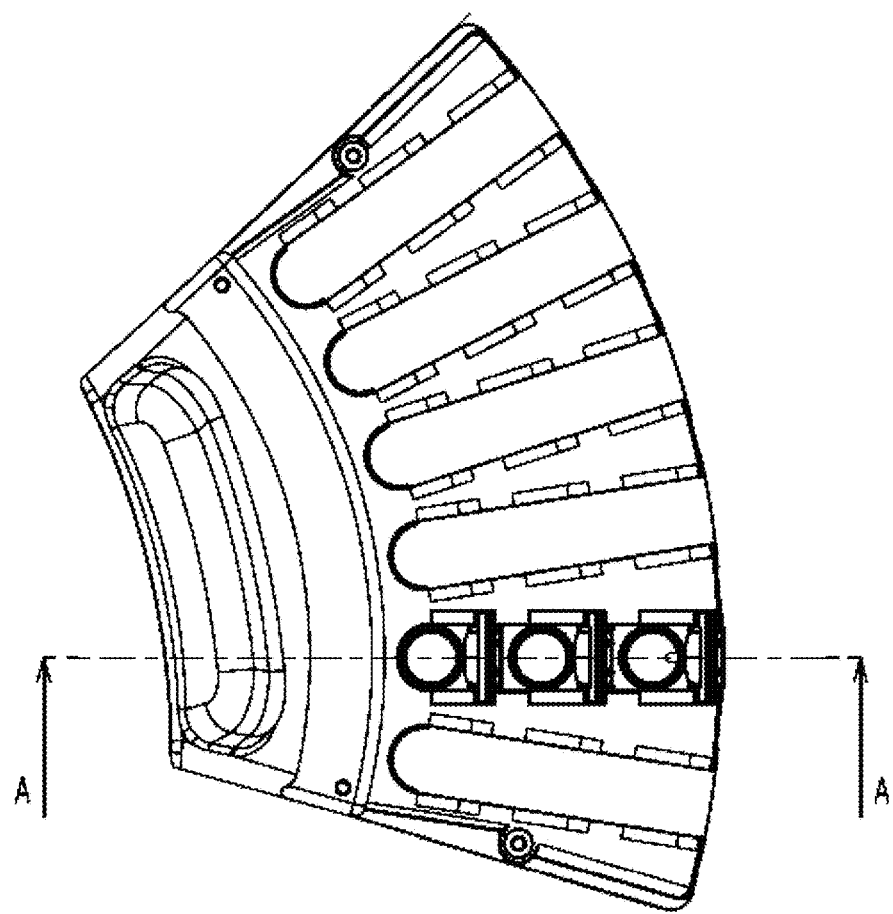
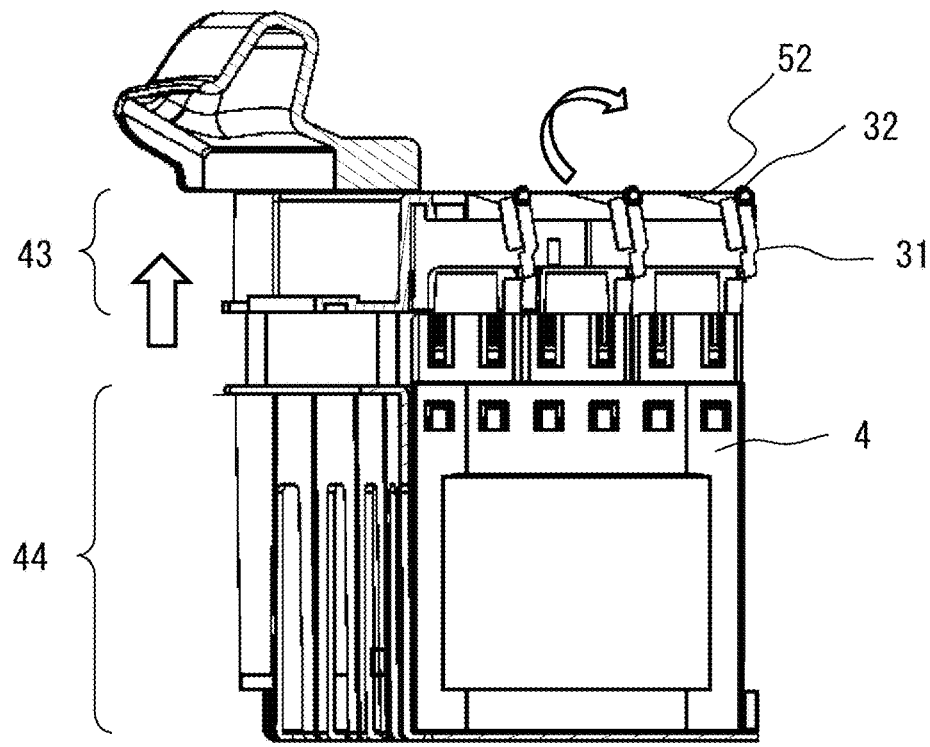

[FIG. 6]
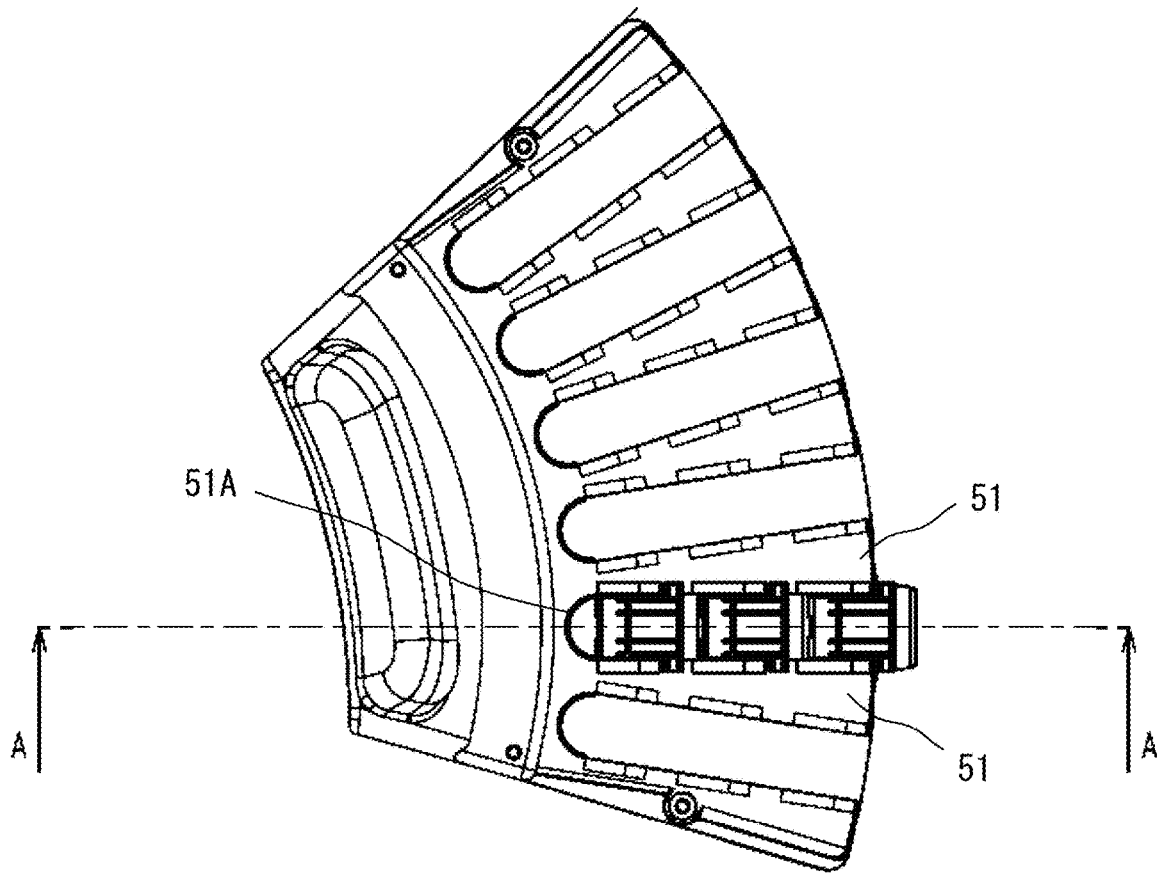
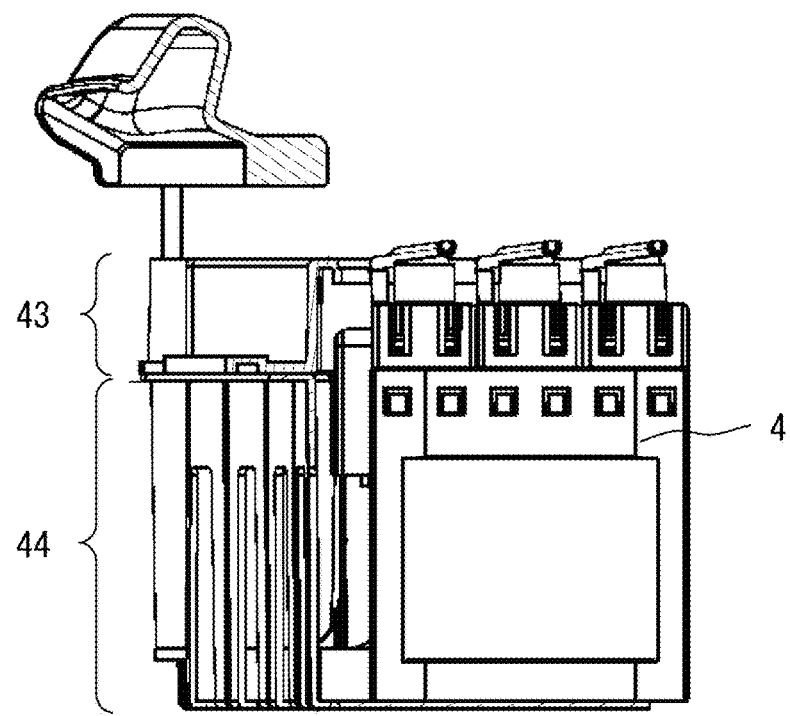

[FIG. 7]
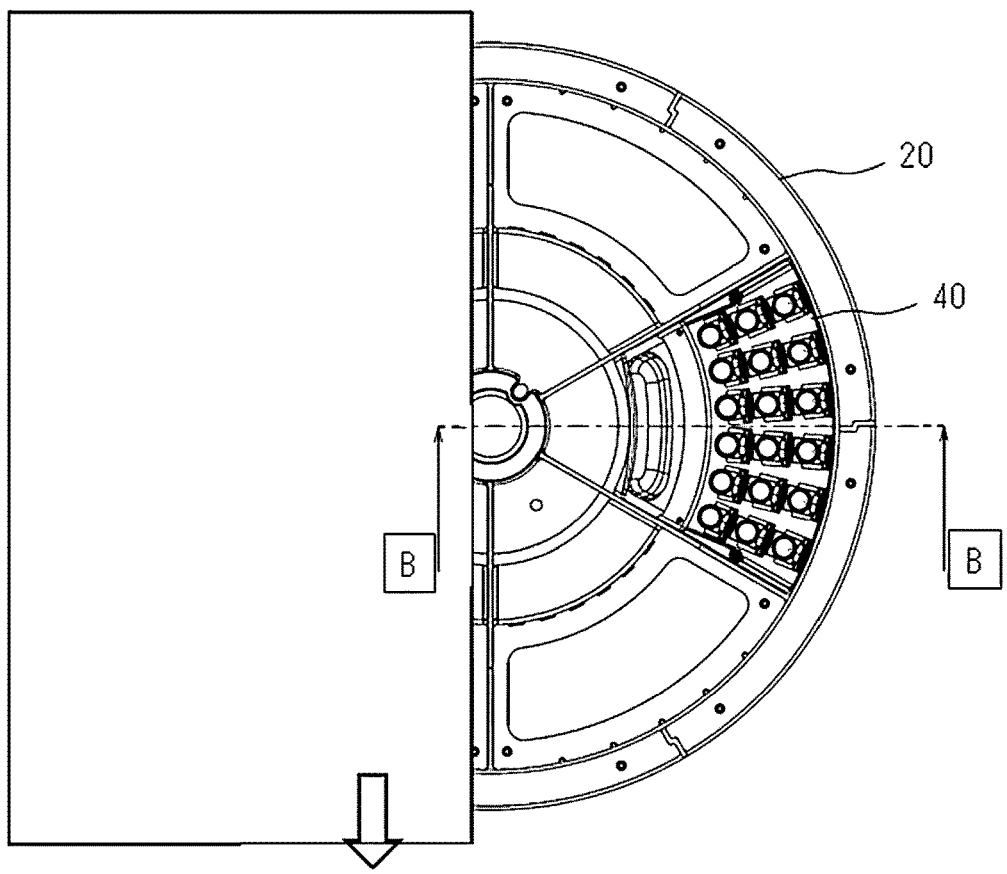
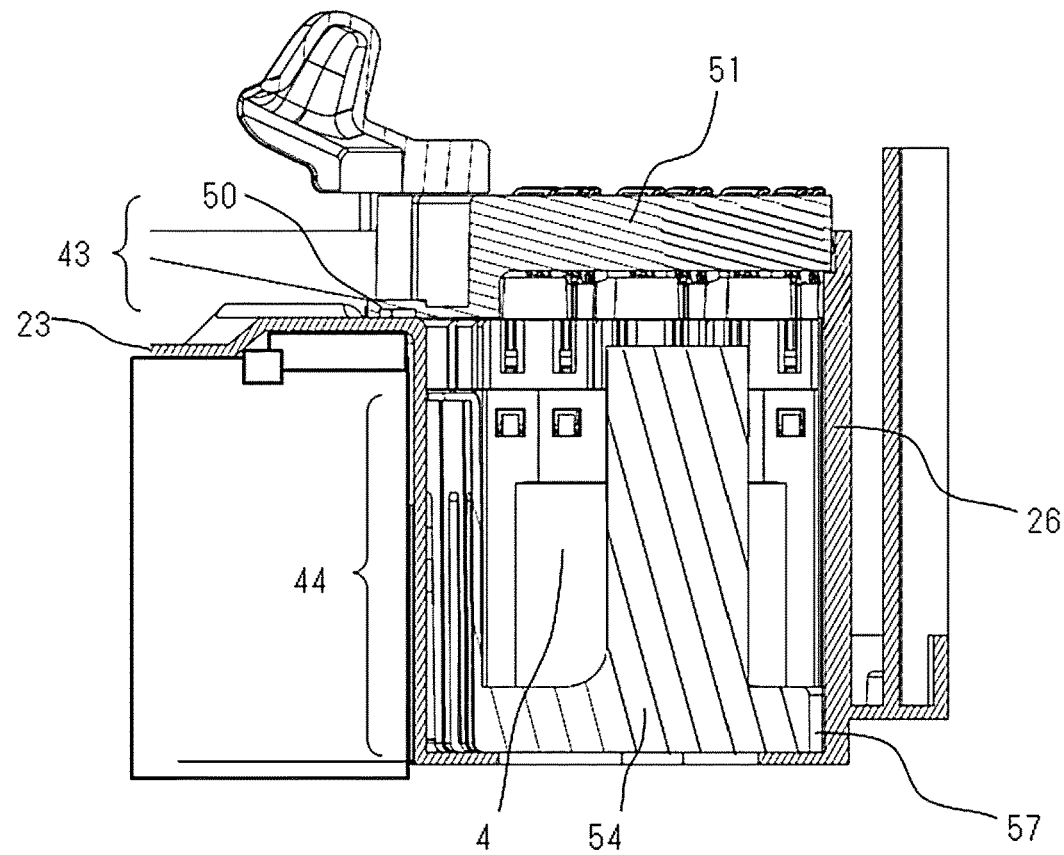

[FIG. 8A]
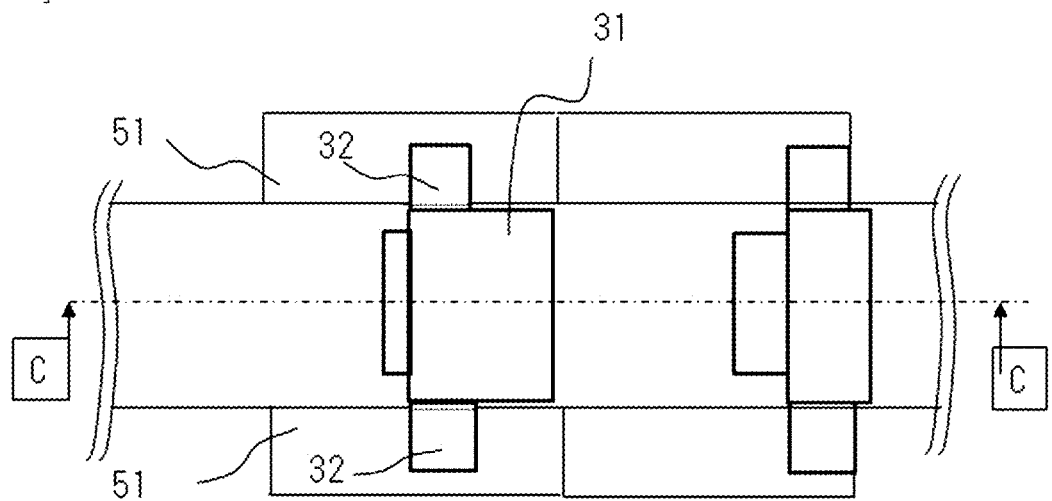
[FIG. 8B]
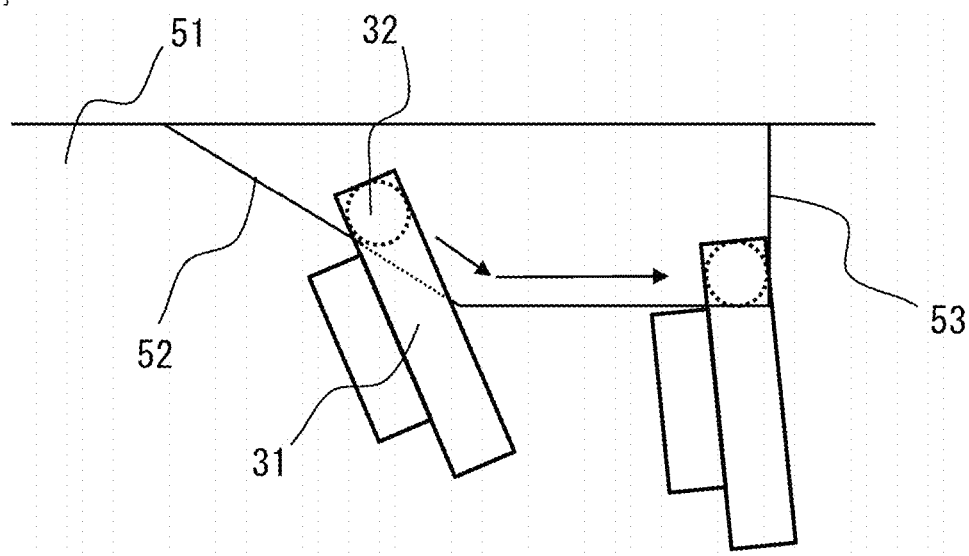
[FIG. 8C]
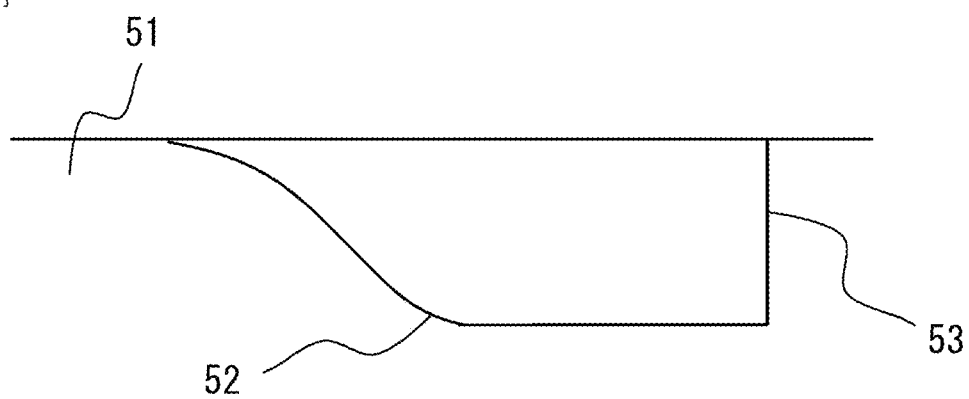

[FIG. 9A]
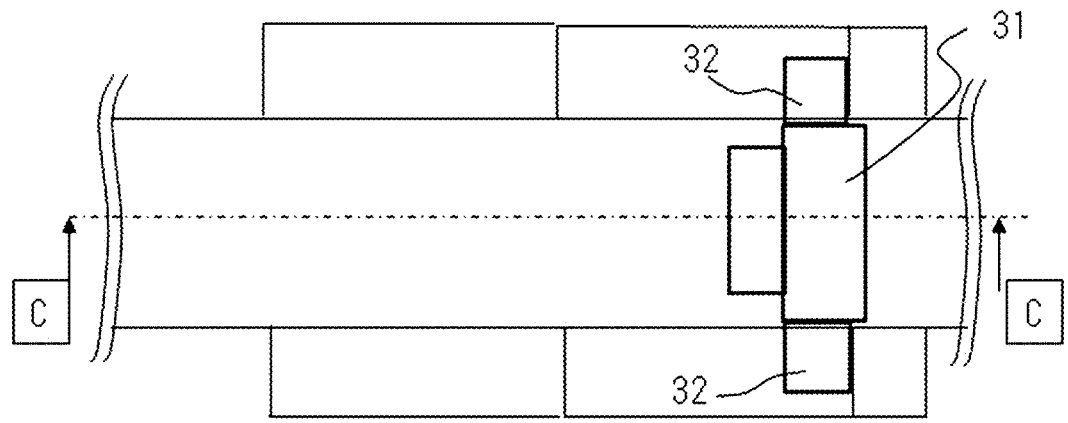
[FIG. 9B]
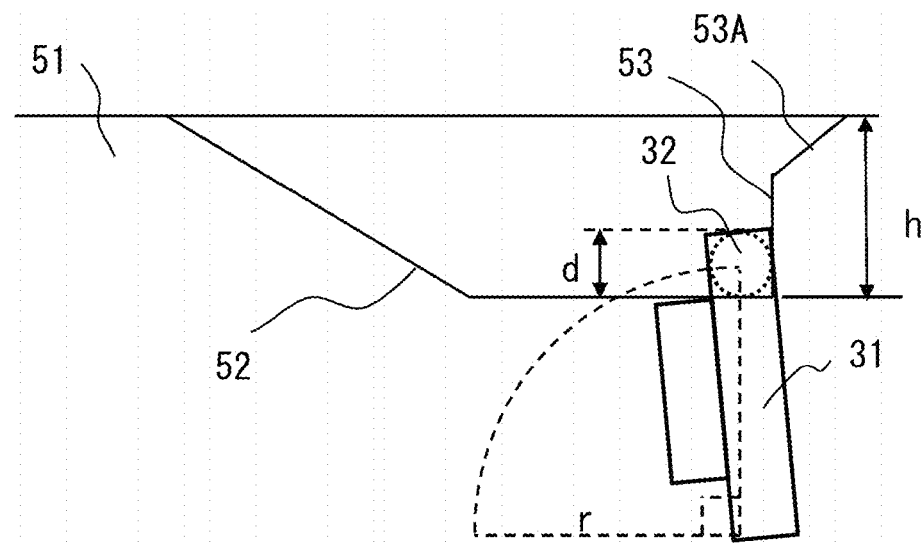
[FIG. 9C]
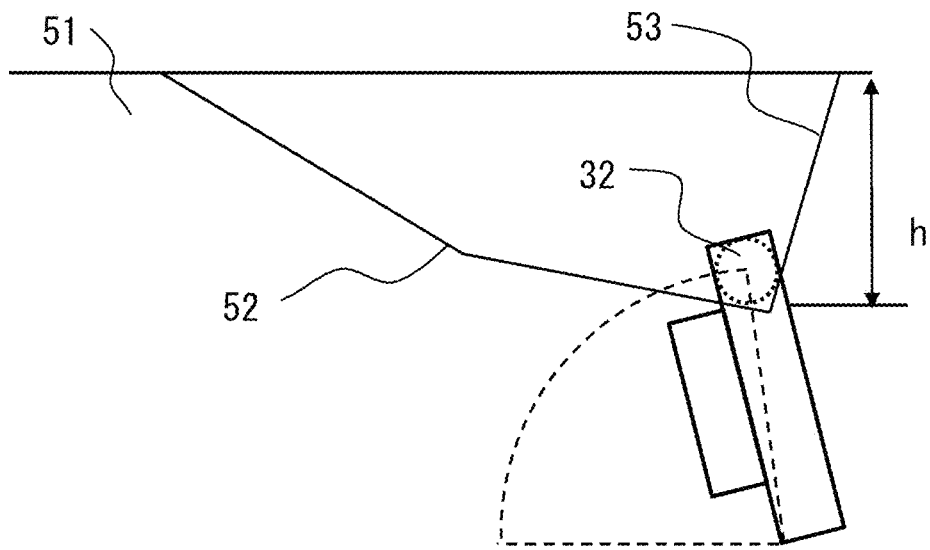

[FIG. 10A]
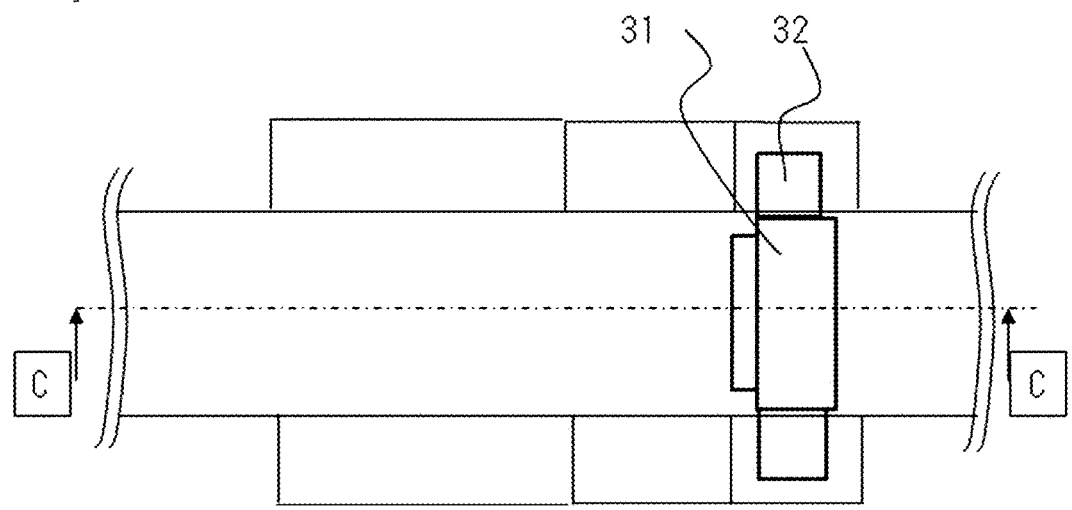
[FIG. 10B]
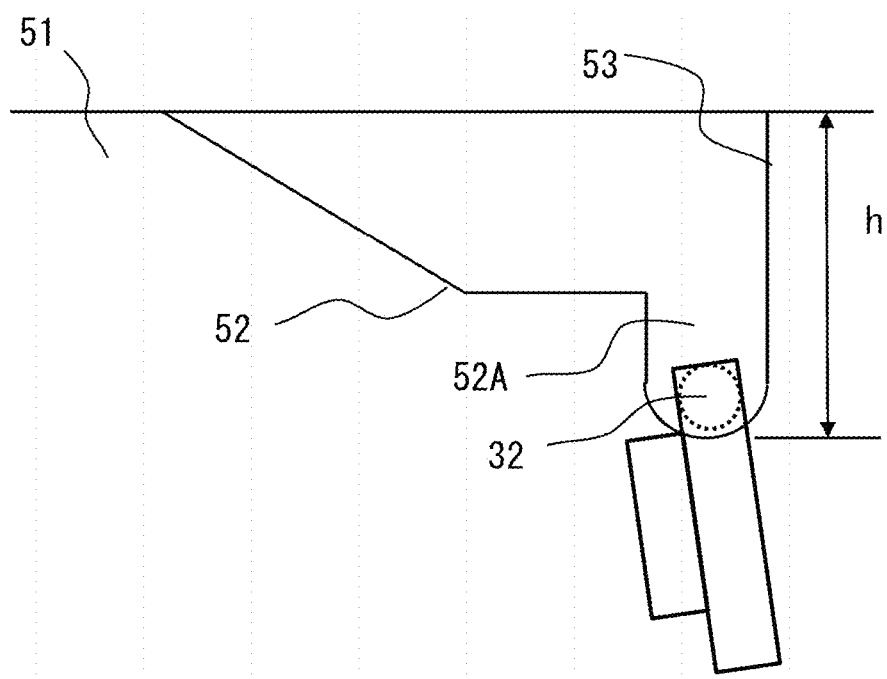

AUTOMATIC ANALYZER

TECHNICAL FIELD

The present invention relates to an automatic analyzer.

BACKGROUND ART

An automatic analyzer is a device that automatically makes quantitative analysis or qualitative analysis of a specific component contained in a specimen such as blood or urine. Various reagents are used for the analysis of specimens by the automatic analyzer. In order to obtain a stable analysis result, it is necessary to prevent condensation of the reagent due to evaporative drying or degradation of the reagent due to contamination with dust or the like. For this reason, the reagent that is used for analysis is stored in a reagent vessel with an openable and closable lid and the lid of the reagent vessel is opened and closed as necessary. In many cases, a plurality of reagent vessels having an upward opening are arranged in one direction and the lid corresponding to each opening is opened and closed along the direction in which the reagent vessels are arranged.

Patent Literature 1 discloses an automatic analyzer in which a plurality of lids openable and closable around a hinge are brought from a hermetically closed state to a half-open state or from a half-open state to a hermetically closed state, or from a half-open state to an open state or from an open state to a half-open state.

CITATION LIST

Patent Literature

Patent Literature 1: Japanese Unexamined Patent Application Publication No. 2017-75789

SUMMARY OF INVENTION

Technical Problem

However, in Patent Literature 1, the lid in an open state may interfere with dispensing of a reagent. In other words, an excessively open lid may cover the opening of an adjacent vessel or an insufficiently open lid may cover the opening of the corresponding opening and thus the lid of the reagent vessel may cover the path where the reagent dispensing unit is inserted into the opening.

Therefore, the present invention has an object to provide an automatic analyzer that prevents the lid of the reagent vessel from interfering with dispensing of a reagent.

Solution to Problem

In order to achieve the above object, the present invention provides an automatic analyzer for analyzing a specimen that is characterized by comprising: a reagent dispensing unit for dispensing a reagent from a reagent bottle in which a plurality of reagent vessels storing reagents used for the analysis of the specimen are arranged in one direction; and a reagent rack in which the reagent bottle is stored. The reagent rack includes a lid opening unit for opening a lid corresponding to an upward opening of the reagent vessel along the direction in which the reagent vessels are arranged, and a lid fixing unit for fixing the lid to the outside of a path where the reagent dispensing unit is inserted into the opening.

The present invention also provides an automatic analyzer for analyzing a specimen that is characterized by comprising: a reagent dispensing unit for dispensing a reagent from a reagent bottle in which a plurality of reagent vessels storing reagents used for the analysis of the specimen are arranged in one direction; a reagent rack in which the reagent bottle is stored; and a lid support unit for opening a lid corresponding to an upward opening of the reagent vessel along the direction of arrangement of the reagent vessels and maintaining an open state of the lid, as the reagent rack moves downward.

Advantageous Effects of Invention

According to the present invention, it is possible to provide an automatic analyzer that prevents the lid of a reagent vessel from interfering with dispensing of a reagent.

BRIEF DESCRIPTION OF DRAWINGS

FIG. 1 is a schematic diagram of the entire configuration of an automatic analyzer.

FIG. 2 is a schematic perspective view of a rack tray provided inside a reagent and specimen storage unit.

FIG. 3A is a diagram showing a reagent bottle with a lid closed.

FIG. 3B is a diagram showing the reagent bottle with the lid open.

FIG. 4A is a schematic perspective view of a reagent rack.

FIG. 4B is a schematic perspective view of the reagent rack into which the reagent bottle with the closed lid is inserted.

FIG. 4C is a schematic perspective view of the reagent rack with the lid of a reagent bottle open.

FIG. 5A is a diagram showing the reagent rack before the reagent bottle with the closed lid is inserted.

FIG. 5B is a diagram showing the reagent rack into which the reagent bottle with the closed lid is inserted.

FIG. 5C is a diagram showing a state in which the lid is opened as a lid support unit moves upward.

FIG. 6 is a diagram showing the reagent rack when a reagent bottle is inserted in an incorrect direction.

FIG. 7 is a diagram showing a rack tray into which a reagent rack storing reagent bottles is inserted.

FIG. 8A is a plan view showing an example of a lid guide unit.

FIG. 8B is a sectional view showing an example of the lid guide unit.

FIG. 8C is a sectional view showing an example of the lid guide unit

FIG. 9A is a plan view showing another example of the lid guide unit.

FIG. 9B is a sectional view showing another example of the lid guide unit.

FIG. 9C is a sectional view showing another example of the lid guide unit.

FIG. 10A is a plan view showing another example of the lid guide unit.

FIG. 10B is a sectional view showing another example of the lid guide unit.

DESCRIPTION OF EMBODIMENTS

Hereinafter, an automatic analyzer according to a preferred embodiment of the present invention will be described referring to accompanying drawings. In the description and accompanying drawings, constituent elements with the same functions are designated by the same reference signs and repeated description thereof is omitted. The drawings schematically show the embodiment and may express real objects in a simplified form.

First Embodiment

Referring to FIG. 1, an explanation is given below of an example of the entire configuration of an automatic analyzer that automatically makes quantitative or qualitative analysis of a specific component contained in a specimen such as blood or urine. The automatic analyzer includes a reagent and specimen storage unit 3, an incubator 1, a reagent dispensing unit 8, a specimen dispensing unit 9, an analysis unit 10, a transport unit 11, a disposal box 15, and a control unit 18.

The reagent and specimen storage unit 3 stores a reagent bottle 4 and a specimen vessel 5 and keeps them at a prescribed temperature. A rack tray 20 that partitions the space in which reagent bottles 4 and specimen vessels 5 are stored is provided inside the reagent and specimen storage unit 3. Details of the rack tray 20 will be explained later referring to FIG. 2. The reagent bottle 4 stores a plurality of reagents that are used for analysis. Details of the reagent bottle 4 will be explained later referring to FIG. 3A and FIG. 3B. The specimen vessel 5 stores a specimen such as blood or urine. A reagent aspiration hole 6 and a specimen aspiration hole 7 are provided on the upper surface of the reagent and specimen storage unit 3 and a reagent stored in the reagent bottle 4 and a specimen stored in the specimen vessel 5 are aspirated through the reagent aspiration hole 6 and the specimen aspiration hole 7, respectively. Inside the reagent and specimen storage unit 3, as the rack tray 20 rotates, the desired reagent bottle 4 or specimen vessel 5 is positioned under the reagent aspiration hole 6 or the specimen aspiration hole 7.

The incubator 1 keeps a reaction vessel 2 placed on the circumference at a fixed temperature and rotates to move the reaction vessel 2 to a specified position. An empty reaction vessel 2 to be placed in the incubator 1 is transported from a vessel tray 14 by the transport unit 11. A reagent and a specimen are dispensed into an empty reaction vessel 2 by the reagent dispensing unit 8 and specimen dispensing unit 9 from the reagent and specimen storage unit 3. More specifically, the reagent dispensing unit 8 is moved on a circular arc indicated by the dotted line in FIG. 1 and inserted into the reagent bottle 4 to aspirate a specified quantity of reagent and dispense the reagent into the empty reaction vessel 2. The specimen dispensing unit 9 is also moved on a circular arc indicated by the dotted line and aspirates a specified quantity of specimen and dispenses the specimen into the reaction vessel 2 into which the reagent has been dispensed. The reagent and specimen that have been dispensed into the reaction vessel 2 react with each other by being kept at a fixed temperature and the result of reaction is analyzed by the analysis unit 10.

In order to prevent contamination of the specimen, the dispensing tip 12 of the specimen dispensing unit 9 may be replaced each time the specimen is dispensed. The dispensing tip 12 is transported by the transport unit 11 from a tip tray 13 to a tip mounting position 16 provided on the upper surface of the disposal box 15, and mounted on the specimen dispensing unit 9 at the tip mounting position 16. The dispensing tip 12 that has been used to dispense the specimen is disposed of into a disposal hole 17 in the disposal box 15. The reaction vessel after analysis is also disposed of into the disposal hole 17.

The control unit 18 controls operation of the abovementioned various units and, for example, it is a CPU (Central Processing Unit). Specifically, rotary motions and temperature control of the reagent and specimen storage unit 3 and the incubator 1, dispensing motions of the reagent dispensing unit 8 and specimen dispensing unit 9, analysis by the analysis unit 10, transportation by the transport unit 11 and so on are controlled by the control unit 18.

An example of the rack tray 20 is explained below referring to FIG. 2. The rack tray 20 includes a disk unit 21, a cylindrical unit 22, a column unit 23, an inner partition 24, and an outer partition 25. The disk unit 21 is a circular plate and may have an opening. The cylindrical unit 22 is a cylindrical member that is concentric to the disk unit 21 and located on the disk unit 21 and has an outer diameter smaller than the outer diameter of the disk unit 21. The column unit 23 is a columnar member that is concentric to the disk unit 21 and located on the disk unit 21 and has a smaller outer diameter than the outer diameter of the cylindrical unit 22 and a smaller height than the height of the cylindrical unit 22.

The inner partition 24 is a plate that equally divides the space between the cylindrical unit 22 and column unit 23 in the circumferential direction. A reagent rack 40 in which a plurality of reagent bottles 4 are mounted is housed in the space surrounded by two inner partitions 24 adjacent to each other in the circumferential direction and the cylindrical unit 22. In each space that houses the reagent rack 40, one or more ribs 26 and one or more inner pins 27 are provided. The rib 26 is located on the inner circumferential surface of the cylindrical unit 22 and extends from the upper surface of the disk unit 21 along the axial direction of the cylindrical unit 22, and part of the reagent rack 40 slides on it. The inner pin 27 is located on the upper surface of the disk unit 21 inside the cylindrical unit 22 and used to determine the position of the reagent rack 40 by being fitted to the reagent rack 40. The rack tray 20 in FIG. 2 has six inner partitions 24 arranged radially from the column unit 23 to the cylindrical unit 22 and can house six reagent racks 40.

The outer partition 25 is a plate that equally divides the space between the cylindrical unit 22 and disk unit 21 in the circumferential direction. A specimen rack 41 in which a plurality of specimen vessels 5 are mounted is housed in the space surrounded by two outer partitions 25 adjacent to each other in the circumferential direction and the cylindrical unit 22 and disk unit 21. In each space that houses the specimen rack 41, one or more outer pins 28 are provided. The outer pin 28 is located on the upper surface of the disk unit 21 outside the cylindrical unit 22 and used to determine the position of the specimen rack 41 by being fitted to the specimen rack 41.

An example of the reagent bottle 4 is explained below referring to FIG. 3A and FIG. 3B. FIG. 3A and FIG. 3B include two side views and a top view of the reagent bottle 4 as well as a front view. The reagent bottle 4 is structured in a manner that a plurality of reagent vessels 30 are integrated by a case 33. The reagent vessels 30 each have an upward opening 36 and a lid 31 for covering the opening 36 and are arranged in one direction. FIG. 3A shows a reagent bottle 4 in which three lids 31 are closed and FIG. 3B shows the reagent bottle 4 in which the three lids 31 are open.

The lid 31 is connected to the reagent vessel 30 by a hinge 35 and opened and closed with the hinge 35 as an axis along the direction in which the reagent vessels 30 are arranged. A protrusion 32 that is used to open and close the lid 31 is provided on the lid 31. For example, the protrusion 32 protrudes toward a direction orthogonal to the direction in which the lid 31 is opened and closed, and has a cylindrical shape. When the opening 36 is covered by the closed lid 31, evaporative drying of the reagent stored in the reagent vessel 30 and contamination of the reagent with dust or the like can be prevented. When dispensing the reagent, the reagent is aspirated by the reagent dispensing unit 8 inserted into the reagent vessel 30 through the opening 36 with the lid 31 open.

An IC tag 34 for use in data management of the reagent bottle 4 may be attached to the case 33. The IC tag 34 may record data on the reagent bottle 4 or an identifier to identify the reagent bottle 4. If an identifier is recorded on the IC tag 34, the data on the reagent bottle 4 and the identifier are associated and stored in a storage unit that the control unit 18 can access. The operator can confirm the orientation of the reagent bottle 4 from the position where the IC tag 34 is attached.

If an excessively open lid 31 covers an adjacent opening 36 or an insufficiently open lid 31 covers the corresponding opening 36, the reagent dispensing unit 8 cannot be inserted into the reagent vessel 30, resulting in a reagent dispensing failure. Therefore, in this embodiment, a lid fixing unit for fixing the lid 31 to the outside of the path for the reagent dispensing unit 8 is provided on the reagent rack 40 so that dispensing of the reagent cannot be interrupted.

An example of the reagent rack 40 is explained below referring to FIG. 4A to FIG. 4C. FIG. 4A is a schematic perspective view of the reagent rack 40 as a single item, FIG. 4B is a schematic perspective view of the reagent rack 40 in which reagent bottles 4 are inserted with the lids 31 closed, and FIG. 4C is a schematic perspective view of the reagent rack 40 with the lids 31 of the reagent bottles 4 closed. The reagent rack 40 includes a handle 42, a lid support unit 43, and a bottle storage unit 44.

The handle 42 is gripped by the operator to carry the reagent rack 40 and connected to the bottle storage unit 44 by two fixed shafts 45.

The bottle storage unit 44 has a plurality of partition walls 54 arranged radially and a bottom surface 56 and a reagent bottle 4 is housed in the space surrounded by two adjacent partition walls 54 and the bottom surface 56. In FIG. 4A to FIG. 4C, seven partition walls 54 are arranged and six reagent bottles 4 can be housed. The bottom surface 56 has a positioning hole 57 as a hole into which an inner pin 27 is fitted, and a rib passage groove 58 as a groove through which a rib 26 passes.

Each of the partition walls 54 has a leaf spring 55 that has a shape protruding from the surface of the partition wall 54 and can be displaced along the concave-convex portion on the side surface of the reagent bottle 4. As the leaf spring 55 fits into the recess of the reagent bottle 4, the position of the reagent bottle 4 is fixed. In other words, this prevents the reagent bottle 4 from falling from the reagent rack 40 under its own weight when the reagent rack 40 is carried or reduces the possibility that the reagent bottle 4 floats up from the bottle storage unit 44.

The lid support unit 43 is located between the handle 42 and the bottle storage unit 44 and can move along the fixed shaft 45 and has a contact unit 50 and a plurality of lid guide units 51. The lid support unit 43 can slide on the bottle storage unit 44 and may be connected with a sliding shaft 46 as a guide for vertical movement of the lid support unit 43. A difference in level may be provided at the lower end of the sliding shaft 46 to limit the range of movement of the lid support unit 43.

The contact unit 50 is located so as to be in contact with the upper surface of the column unit 23 when the reagent rack 40 is placed in the rack tray 20. Specifically, when the reagent rack 40 is placed in the rack tray 20, the contact unit 50 is in contact with the upper surface of the column unit 23 and thereby moves the lid support unit 43 upward.

The lid guide unit 51 is located above each of the partition walls 54 and when the reagent rack 40 is placed in the rack tray 20, the lower surface of the lid guide unit 51 is in contact with the upper surface of the rib 26. Specifically, when the reagent rack 40 is placed in the rack tray 20, the lid support unit 43 is also moved upward by contact of the lower surface of the lid guide unit 51 with the upper surface of the rib 26. The lid guide units 51 that are adjacent to each other are arranged with the distance equal to the outer diameter of the opening 36 of the reagent vessel 30 and connected by a semicircular unit 51A. The semicircular unit 51A has the same shape as the side surface of the opening 36 of the reagent vessel 30 and prevents the reagent bottle 4 from being inserted in the reverse direction. Details of the semicircular unit 51A will be explained later referring to FIG. 6.

A slope 52 and a stopper 53 are provided on the upper surface of each of the lid guide units 51. The slope 52 is an inclined surface on which the protrusion 32 of the lid 31 slides when the lid support unit 43 moves upward, and functions as a lid opening unit that opens the lid 31 of the reagent vessel 30. The stopper 53 is a wall surface that stands on the slope 52, and functions as a lid fixing unit that fixes the lid 31 to the outside of the path for the reagent dispensing unit 8. Specifically, as the lid support unit 43 moves upward, the lid 31 of the reagent vessel 30 is opened and fixed to the outside of the path for the reagent dispensing unit 8. Details of the slope 52 and stopper 53 will be described later referring to FIG. 8A to FIG. 8C, FIG. 9A to FIG. 9C, and FIG. 10A and FIG. 10B.

How the reagent rack 40 opens the lid 31 of the reagent vessel 30 will be explained referring to FIG. 5A to FIG. 5C. FIG. 5A is a plan view of the reagent rack 40 before insertion of the reagent bottle 4 with the lid 31 closed and a sectional view taken along the line A-A, FIG. 5B is a plan view of the reagent rack 40 after insertion of the reagent bottle 4 with the lid 31 closed and a sectional view taken along the line A-A, and FIG. 5C is a plan view of the reagent rack 40 with the lid 31 of the reagent bottle 4 open and a sectional view taken along the line A-A.

The reagent bottle 4 with the lid 31 closed is inserted into the reagent rack 40 from the outer circumferential side as shown in FIG. 5A. In the process in which the reagent bottle 4 is inserted, the leaf spring 55 is displaced along the concave-convex portion of the side surface of the reagent bottle 4 and as the side surface of the opening 36 of the reagent vessel 30 is placed in the semicircular unit 51A, the leaf spring 55 is fitted into the recess of the side surface of the reagent bottle 4 and the position of the reagent bottle 4 is fixed. When the reagent bottle 4 is fixed in the reagent rack 40, as shown in FIG. 5B, the protrusion 32 is at the uppermost position of the slope 52 and the lid 31 remains closed. When the reagent rack 40 is inserted into the rack tray 20 with the reagent bottle 4 fixed in the reagent rack 40, the contact unit 50 is in contact with the upper surface of the column unit 23 and the lower surface of the lid guide unit 51 is in contact with the rib 26. As the reagent rack 40 is further inserted into the rack tray 20, the lid support unit 43 moves upward. The upward movement of the lid support unit 43 causes the protrusion 32 to slide on the surface of the slope 52 while being pushed upward and the lid 31 opens as shown in FIG. 5C. The lid 31 that has opened is fixed to the outside of the path for the reagent dispensing unit 8 by the stopper 53.

Referring to FIG. 6, an explanation is given below of the case that the reagent bottle 4 is inserted into the reagent rack 40 in the reverse direction. When the reagent bottle 4 is inserted correctly, as shown in FIG. 5B the side surface of the opening 36 of the reagent vessel 30 fits into the semicircular unit 51A. On the other hand, if the reagent bottle 4 is inserted in the reverse direction, the shape of the portion to be connected to the hinge 35 does not fit the semicircular unit 51A and the reagent bottle 4 protrudes from the reagent rack 40. When the reagent bottle 4 protrudes from the reagent rack 40, the reagent rack 40 cannot be inserted into the rack tray 20, thereby preventing the reagent bottle 4 from being inserted in the reverse direction.

Referring to FIG. 7, an explanation is given below of the state in which the reagent rack 40 storing the reagent bottles 4 is inserted in the rack tray 20. FIG. 7 is a plan view of the rack tray 20 in which the reagent rack 40 is inserted and a sectional view taken along the line B-B. As the operator holds the handle 42 and inserts the reagent rack 40 from above the rack tray 20, the column unit 23 pushes up the contact unit 50 and the rib 26 pushes up the lid guide unit 51 and the lid guide unit 51 moves upward. As the lid guide unit 51 moves upward, the protrusion 32 slides on the surface of the slope 52 and the lid 31 opens.

An example of the slope 52 and stopper 53 is explained below referring to FIG. 8A to FIG. 8C. FIG. 8A is a plan view of the lid guide unit 51 and FIG. 8B and FIG. 8C are sectional views taken along the line C-C of FIG. 8A. The slope 52 has a cross-sectional shape that follows the locus of the protrusion 32 when the lid 31 is opened and for example, it may be a combination of different inclined surfaces as shown in FIG. 8B or a surface including a smooth curve as shown in FIG. 8C. Since the slope 52 has a cross-sectional shape that follows the locus of the protrusion 32, when the protrusion 32 is positioned at the bottom surface of the slope, the lid 31 does not become insufficiently open, thereby preventing the opening 36 corresponding to the lid 31 from being covered. In addition, when the cross-sectional shape of the slope 52 includes a smooth curve, the protrusion 32 slides smoothly. Furthermore, when the protrusion 32 is in contact with the stopper 53, the lid 31 does not become excessively open, thereby preventing the adjacent opening 36 from being covered by the lid 31.

Another example of the slope 52 and stopper 53 is explained below referring to FIG. 9A to FIG. 9C. FIG. 9A is a plan view of the lid guide unit 51 and FIGS. 9B and 9C are sectional views taken along the line C-C of FIG. 9A. Preferably, height h of the slope 52 from the bottom surface to the top surface should be larger than outer diameter d of the protrusion 32. With h>d, it is difficult for the protrusion 32 to deviate from the space surrounded by the slope 52 and stopper 53, so the lid 31 is prevented from being excessively open. Preferably, the stopper 53 should have a surface that forms an angle with the bottom surface of the slope 52 that is equal to or greater than a right angle. For example, FIG. 9B shows that the stopper 53 standing vertically has an inclined surface 53A at its upper end and FIG. 9C shows that the stopper 53 is inclined upward. When the stopper 53 has a surface that forms an angle with the bottom surface of the slope 52 that is equal to or greater than a right angle, the protrusion 32 is prevented from being caught by the upper end of the stopper 53 when the reagent bottle 4 is taken out of the reagent rack 40.

Another example of the slope 52 and stopper 53 is explained below referring to FIG. 10A and FIG. 10B. FIG. 10A is a plan view of the lid guide unit 51 and FIG. 10B is a sectional view taken along the line C-C of FIG. 10A. A groove 52A in which the protrusion 32 is fitted may be provided between the slope 52 and stopper 53. As the protrusion 32 is fitted into the groove 52A, opening and closing of the lid 31 is suppressed.

The embodiment of the present invention has been so far described. The present invention is not limited to the above embodiment, but the constituent elements may be modified without departing from the gist of the present invention. Also, several of the constituent elements disclosed in the above embodiment may be combined as appropriate. Furthermore, some of all the constituent elements described in the above embodiment may be deleted. For example, the specimen rack 41 may be stored not in the rack tray 20 but in another case so that a specimen is dispensed from the case.

REFERENCE SIGNS LIST

1: incubator
2: reaction vessel
3: reagent and specimen storage unit
4: reagent bottle
5: specimen vessel
6: reagent aspiration hole
7: specimen aspiration hole
8: reagent dispensing unit
9: specimen dispensing unit
10: analysis unit
11: transport unit
12: dispensing tip
13: tip tray
14: vessel tray
15: disposal box
16: tip mounting position
17: disposal hole
18: control unit
20: rack tray
21: disk unit
22: cylindrical unit
23: column unit
24: inner partition
25: outer partition
26: rib
27: inner pin
28: outer pin
30: reagent vessel
31: lid
32: protrusion
33: case
34: IC tag
35: hinge
36: opening
40: reagent rack
41: specimen rack
42: handle
43: lid support unit
44: bottle storage unit
45: fixed shaft
46: sliding shaft
50: contact unit
51: lid guide unit
51A: semicircular unit
52: slope
52A: groove
53: stopper
53A: inclined surface
54: partition wall 55: leaf spring
56: bottom surface
57: positioning hole
58: rib passage groove

The invention claimed is:

1. An automatic analyzer for analyzing a specimen, comprising:
   a reagent dispensing unit configured to dispense a reagent from a reagent bottle in which a plurality of reagent vessels storing reagents used for the analysis of the specimen are arranged in one direction,
   a reagent rack in which the reagent bottle is stored, wherein the reagent rack includes a lid opening unit configured to open a lid corresponding to an upward opening of one of the plurality of reagent vessels along the one direction in which the plurality of reagent vessels are arranged, and a lid fixing unit configured to fix the lid outside of a path where the reagent dispensing unit is inserted into the upward opening, and
   a lid support unit configured to move vertically along a fixed shaft, such that upward movement of the lid support unit is configured to cause the lid opening unit to open the lid, wherein
   the lid includes a protrusion that protrudes in a direction orthogonal to the one direction in which the reagent vessels are arranged and along which the lid opens,
   the lid opening unit is a slope provided on an upper surface of the reagent rack, on which the protrusion slides, and
   the lid fixing unit is a wall surface that forms an angle equal to or larger than a right angle with a bottommost surface of the slope.

2. The automatic analyzer according to claim 1, wherein the slope has a cross-sectional shape that follows a locus of the protrusion when the lid is opened.

3. The automatic analyzer according to claim 2, wherein the cross-sectional shape of the slope includes a smooth curve.

4. The automatic analyzer according to claim 1, wherein height from a bottom surface of the slope to a top surface of the reagent rack is larger than an outer diameter of the protrusion.

5. The automatic analyzer according to claim 1, wherein the wall surface has a surface that forms an angle with the bottom surface of the slope that is equal to or greater than a right angle.

6. The automatic analyzer according to claim 1, wherein a groove in which the protrusion is fitted is provided between the slope and the wall surface.

7. The automatic analyzer according to claim 1, wherein the reagent rack further includes a reverse insertion prevention unit configured to prevent a storage of the reagent bottle except when the reagent bottle is inserted from a predetermined direction.

8. The automatic analyzer according to claim 7, wherein the reagent rack further includes a leaf spring that fits into a recess provided on a side surface of the reagent bottle when the reagent bottle is inserted from a predetermined direction and stored therein.

* * * * *